Nov. 6, 1928.
G. J. THOMAS
1,690,382
BRAKE APPLYING MECHANISM
Filed Sept. 15, 1926
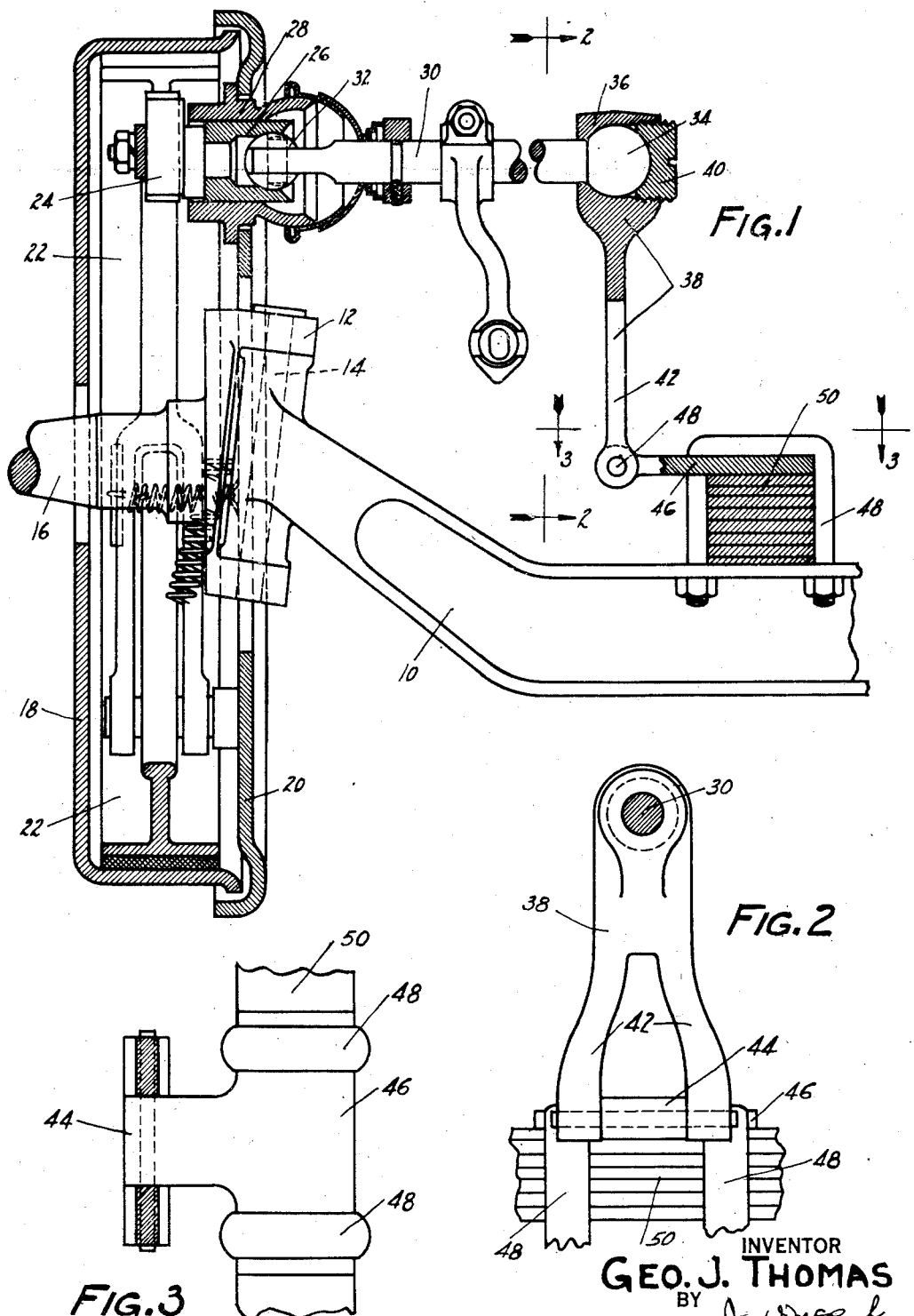

Patented Nov. 6, 1928.

1,690,382

UNITED STATES PATENT OFFICE.

GEORGE J. THOMAS, OF SOUTH BEND, INDIANA, ASSIGNOR TO BENDIX BRAKE COMPANY, OF CHICAGO, ILLINOIS, A CORPORATION OF ILLINOIS.

BRAKE-APPLYING MECHANISM.

Application filed September 15, 1926. Serial No 135,527.

This invention relates to brakes and is illustrated as embodied in a novel mechanism for applying a brake acting on one wheel of a motor vehicle. An object of the invention is to provide on the vehicle axle a support for the inner end of a brake-applying shaft which will permit the rotation of the shaft and which will not bind on the shaft in any position. Having this object in view, I prefer to connect to the end of the shaft, by a suitable universal joint, a vertically-extending support which is pivotally secured at its opposite end to a mounting part carried by the axle and which is shown as the usual spring pad forming a part of the means for clamping the vehicle spring to the axle. This mechanism is especially well adapted for operating a front wheel brake, in which case one end of the shaft is universally supported as described above while the other end of the shaft is universally supported by the brake itself by means of a joint arranged in the swivelling axis of the wheel.

The above and other objects and features of the invention, including various novel combinations of parts and desirable particular constructions, will be apparent from the following description of one illustrative embodiment shown in the accompanying drawings, in which:

Figure 1 is a vertical section through one front brake and its associated parts, and showing one end of the axle in rear elevation;

Figure 2 is a section on the line 2—2 of Figure 1, showing the pivotally mounted support in side elevation; and Figure 3 is a partial section on the line 3—3 of Figure 1, showing the use of the spring pad as a mounting member.

In the arrangement illustrated, the front axle 10 has a knuckle 12 swivelled at one end by means such as a kingpin 14. The vehicle wheel (not shown) is rotatably mounted on the spindle 16 of the knuckle and carries with it in its rotation a suitable brake drum 18 which may be closed at its open side by a backing plate 20 and within which are arranged brake shoes 22 operated by means such as a cam 24 operated by a short shaft 26 journalled in a bearing 28 carried by the backing plate 20. The brake illustrated may, if desired, be substantially as more fully described in Patent No. 1,567,716, granted Bendix Brake Company December 29, 1925, on an application filed by A. Y. Dodge.

According to an important feature of the present invention, the brake is operated by a shaft 30 extending in a general way in the same direction as the axle 10, that is, approximately perpendicular to the brake, and operatively connected at its outer end to the shaft 26 by a suitable universal joint 32 which serves as a universal support for the outer end of the shaft substantially in the swivelling axis of the wheel. The opposite end of the shaft is also universally supported, for example by being formed with a ball 34 seated in a socket 36 formed on the upper end of a support 38 and closed by a plug 40. The lower end of the support 38 is forked to form a pair of arms 42 straddling and pivotally connected to a part 44 of a mounting member such as spring pad 46. The particular pivotal connection shown is a pintle 48 and the spring pad is shown in Figures 2 and 3 as engaged by the usual U-bolts 48 securing the spring 50 to the axle 10. By this arrangement the support 38 may swing about the pintle 48 to prevent binding of the shaft at its universally supported end.

While one illustrative embodiment of the invention has been described in detail, it is not my intention to limit the scope of the invention to that particular embodiment or otherwise than by the terms of the appended claims.

I claim:

1. A vehicle having, in combination, an axle having a front wheel knuckle swivelled at its end, a brake carried by the knuckle, a mounting part on the axle, a support pivoted to said part at its lower end and extending upwardly opposite the upper part of the brake and adapted to swing about its pivot toward and away from said brake, and a brake-applying shaft universally supported at one end by the upper end of the support and universally supported at its other end by the brake in the swiveling axis of the knuckle.

2. In a motor vehicle, a brake support carried by an axle, a brake cam shaft carried by said support, a brake-operating shaft universally connected to said cam shaft and extending inwardly therefrom, said operating shaft terminating in a ball end, and a hinge, one-half of which is secured to a part of the vehicle supported by and above the axle of said vehicle and the other half of which is bifurcated and straddles the first-mentioned half to provide a pair of relatively widely spaced pivot points and is provided at its opposite end with a socket for universally supporting said ball end and permitting movement thereof towards and away from said part.

3. A vehicle having, in combination, an axle carrying a swivelled wheel at one end, a brake for the wheel, a brake applying shaft universally journaled at one end in the swivelling axis of the wheel and extending inwardly therefrom and substantially parallel to the axle and provided with a ball at its inner end, a spring secured to the axle by means including a spring pad extending outwardly laterally beyond the spring substantially parallel to the axle and provided with a pivot at its outer end, an upright support mounted upon said pivot for swinging movement and provided with a socket at its upper end universally supporting the ball at the inner end of the brake applying shaft.

4. A vehicle having an axle provided with a swivelled wheel having a brake, an applying shaft connected at one end of the brake and extending inwardly therefrom substantially parallel to the axle, a spring supported on the axle, means securing the spring to the axle including a hinge having leaves of unequal length and the shorter leaf of which has a lateral extension secured to the top of the spring as a spring pad and which extends outwardly laterally therefrom and the longer leaf of which extends upwardly from its pivotal connection with the shorter leaf and is provided at its upper end with a socket supporting the ball at the inner end of the brake applying shaft.

In testimony whereof, I have hereunto signed my name.

GEORGE J. THOMAS.